United States Patent [19]
McClain

[11] Patent Number: 5,544,763
[45] Date of Patent: Aug. 13, 1996

[54] VEHICLE STABILIZED SUPPORT STAND FOR BICYCLES

[76] Inventor: David W. McClain, 4015 Fernwood, Houston, Tex. 77021

[21] Appl. No.: 317,167

[22] Filed: Oct. 3, 1994

[51] Int. Cl.⁶ ................................................ A47F 7/00
[52] U.S. Cl. .......................... 211/22; 211/17; 248/176.1
[58] Field of Search ..................... 211/17, 22; 248/176, 248/187, 127

[56] References Cited

U.S. PATENT DOCUMENTS

| | | | |
|---|---|---|---|
| 518,325 | 4/1894 | Mueller | 211/22 |
| 559,312 | 4/1896 | Seely | 248/176 X |
| 2,801,818 | 8/1957 | Wojdyla | 248/176 X |
| 3,514,091 | 5/1970 | Johnson et al. | 211/22 X |
| 3,589,717 | 6/1971 | Alexander | 211/22 X |
| 3,981,491 | 9/1976 | Snyder | 211/22 X |
| 4,047,685 | 9/1977 | Wika | 248/176 X |
| 5,320,227 | 6/1994 | Minoura | 211/22 |
| 5,385,246 | 1/1995 | Grossnickle | 211/22 |

Primary Examiner—Robert W. Gibson, Jr.
Attorney, Agent, or Firm—Bush, Moseley, Riddle & Jackson

[57] ABSTRACT

A portable bicycle stand is provided having a base from which a support strut projects upwardly and outwardly. The upper portion of the support strut is provided with a bicycle support element having an upwardly facing recess which is adapted to receive the horizontal tube of a bicycle frame so as to support the bicycle in upright position with its wheels above the ground. The bicycle support is provided with a bicycle frame stay which enables the bicycle frame to be locked by the stay in supported assembly with the support element. The base of the bicycle stand defines a vehicle wheel engaging portion on which a vehicle wheel is to be positioned to secure the base to the ground and stabilize the bicycle stand as well as preventing theft of the bicycle stand when it is left unattended. The bicycle stand is also provided with a movable outrigger to stabilize it when not secured by a vehicle wheel and is provided with a handle bar stabilizer for securing the handle bar and front wheel assembly of the bicycle against free movement.

20 Claims, 2 Drawing Sheets

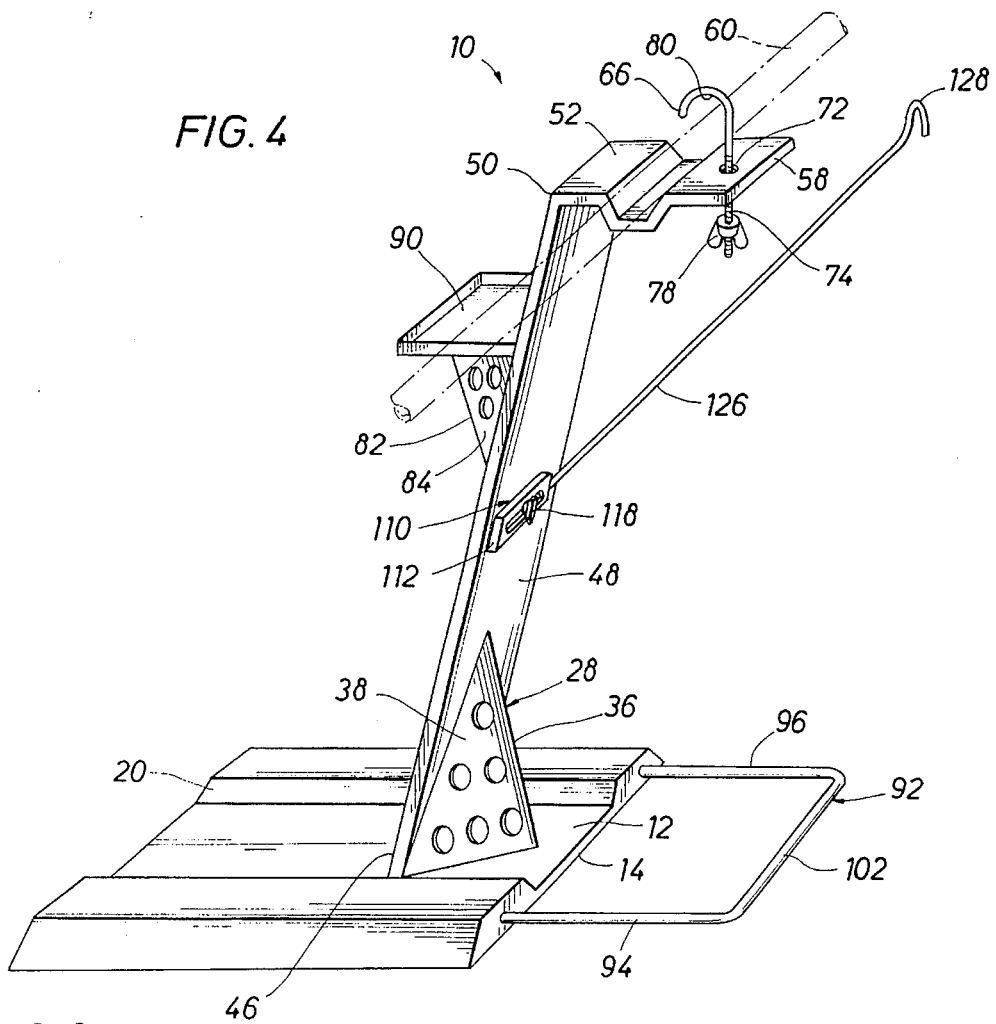
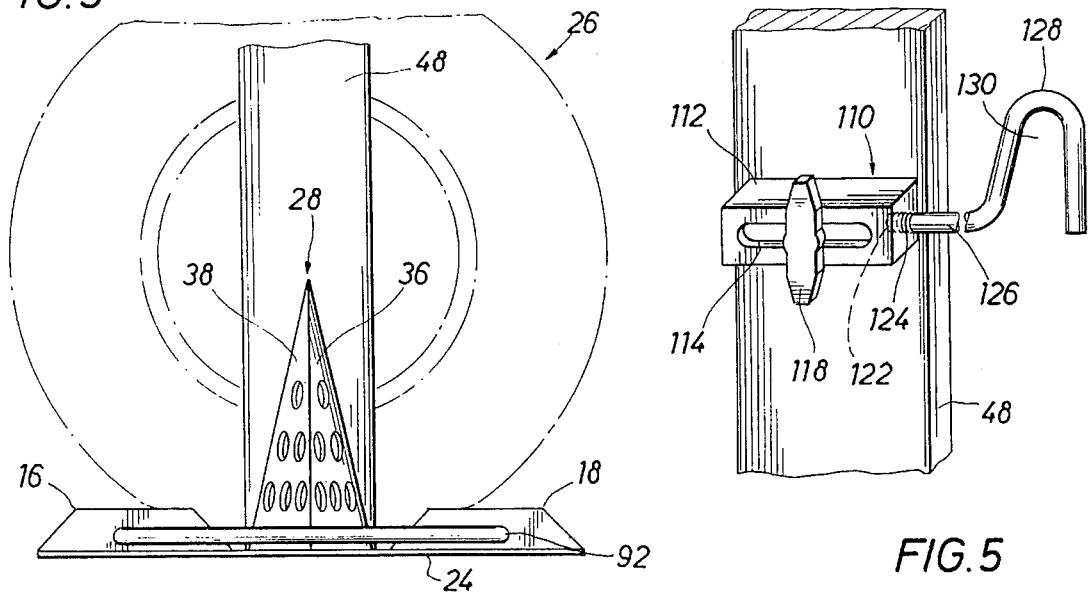

5,544,763

VEHICLE STABILIZED SUPPORT STAND FOR BICYCLES

FIELD OF THE INVENTION

This invention relates generally to bicycle stands for support of bicycles to enable them to be efficiently serviced, repaired or cleaned. More particularly, this invention relates to a bicycle stand mechanism which is stabilized by the weight of one wheel of an automotive vehicle to enable the bicycle stand to support a bicycle in elevated manner for any suitable purpose and to minimize the possibility of theft of the bicycle stand such as when used at remote locations that are accessible by the public.

BACKGROUND OF THE INVENTION

For the reason that high performance bicycles are not provided with on board support stands typically referred to as kickstands, when not being ridden such bicycles must either be positioned on their sides on the ground or leaned against trees, buildings, automotive vehicles and other structures so that the bicycle will be somewhat protected from dirt, sand and other hazards of the environment. It is desirable that bicycles rest in an upright position when not being used so that users will typically find any suitable object to lean the bicycle on so that it can be in a somewhat standing position. Obviously when a bicycle is lying on the ground, in addition to potential fouling of the bicycle mechanism by dirt, sand other debris, it can be inadvertently stepped on by persons in the area, which presents a safety hazard, or run over by bicycles or vehicles that might be operating in the area. In these events it is obvious that serious damage can occur to the bicycle mechanism if it is stepped on or run over. Also, when bicycles are leaned against objects such as automobiles, trees, etc. they can easily be accidentally knocked over which in many cases can cause damage to the bicycle mechanism. Obviously it is desirable to provide a mechanism for temporary support of the bicycle in a somewhat standing position and to secure the bicycle in such manner that it will not inadvertently fall from its supported position or being inadvertently knocked over by others. It is also desirable to provide a bicycle support mechanism that can be efficiently used in remote locations such as at the gathering point for bicycle rides, races and other contests and be protected against theft while the bicycle stand is unattended.

SUMMARY OF THE INVENTION

It is a principal feature of the present invention to provide a novel portable bicycle stand that can be used at remote locations for efficiently supporting a bicycle in an upright position or in other suitable positions so that a bicycle supported thereby may be efficiently serviced, repaired or cleaned.

It is another feature of this invention to provide a novel portable bicycle stand mechanism that is capable of being stabilized by the wheel of an automotive vehicle so that the bicycle stand and a bicycle supported thereby will not inadvertently fall over or be knocked over.

It is an even further feature of this invention to provide a novel portable bicycle stand mechanism that is capable of being secured by the weight of a wheel of an automotive vehicle so that the bicycle stand even when unattended in a remote location is protected from theft and damage to the extent that its base section is retained and secured by the weight of one of the wheels of an automotive vehicle.

Briefly the various objects and features of the present invention set forth herein are provided by a novel portable bicycle stand mechanism having a support base defining a recess or groove within which may be located one of the wheels of an automotive vehicle so that the weight of the automotive vehicle will secure the base structure in firm support with the ground and prevent unauthorized movement of the base from the location established by the user. The base structure is further stabilized when the bicycle stand is not in use by means of a movable outrigger type stabilizer which prevents the bicycle stand from inadvertently falling over.

An upstanding support strut is connected to the base and is disposed at an angle so that a bicycle support mechanism provided at the upper end of the angulated support strut will be located sufficiently away from the sides of the automotive vehicle that the bicycle can be supported in a manner that it is well clear of the sides of the automotive vehicle. The bicycle support mechanism at the upper end of the upstanding support strut is defined by a generally parallel, horizontally oriented support element preferably being integral with the support strut and having a groove or upwardly facing recess therein for support of the crossbar of a bicycle frame. The horizontal support is provided with a locking element that secures the bicycle frame so that it can not be inadvertently raised or moved from its supported position. The bicycle support mechanism also includes a handlebar stabilizing strut which is adjustably mounted to the upstanding support strut and which can be adjusted to engage and secure the bicycle handlebar in a desired position and thus also secure the front bicycle wheel at a desired position and against inadvertent movement. When the wheel of an automotive vehicle is resting on the base structure of the bicycle stand device the weight of the automotive vehicle wheel will provide sufficient stand stability that the bicycle stand can not be inadvertently knocked over and the bicycle supported thereby will be adequately supported in an upright and stable position preferably with its wheels clear of the ground so that the bicycle may be cleaned, serviced or repaired in this position.

Theft of the bicycle stand mechanism of this invention is difficult even when the bicycle stand is unattended because the weight of the vehicle wheel will secure the base portion of the bicycle stand so that the base portion can be moved only after the weight of the vehicle wheel is removed.

BRIEF DESCRIPTION OF THE DRAWINGS

The present invention has the above as well as other objects, features and advantages which will become more clearly apparent in connection with the following detailed description of a preferred embodiment, taken in conjunction with the appended drawings in which:

In The Drawings

FIG. 3 is a partial front elevational view of the portable vehicle stabilized bicycle stand of FIGS. 1 and 2 with a vehicle wheel resting on the support base thereof as shown in broken line.

FIG. 4 is an isometric illustration of the portable vehicle stabilized bicycle stand mechanism of FIGS. 1–3.

FIG. 5 is a partial isometric illustration of the upstanding support strut portion of the vehicle stabilized bicycle stand of FIG. 4, showing the handlebar stabilizing strut thereof in detail.

DETAILED DESCRIPTION OF PREFERRED EMBODIMENTS

Figure 1:
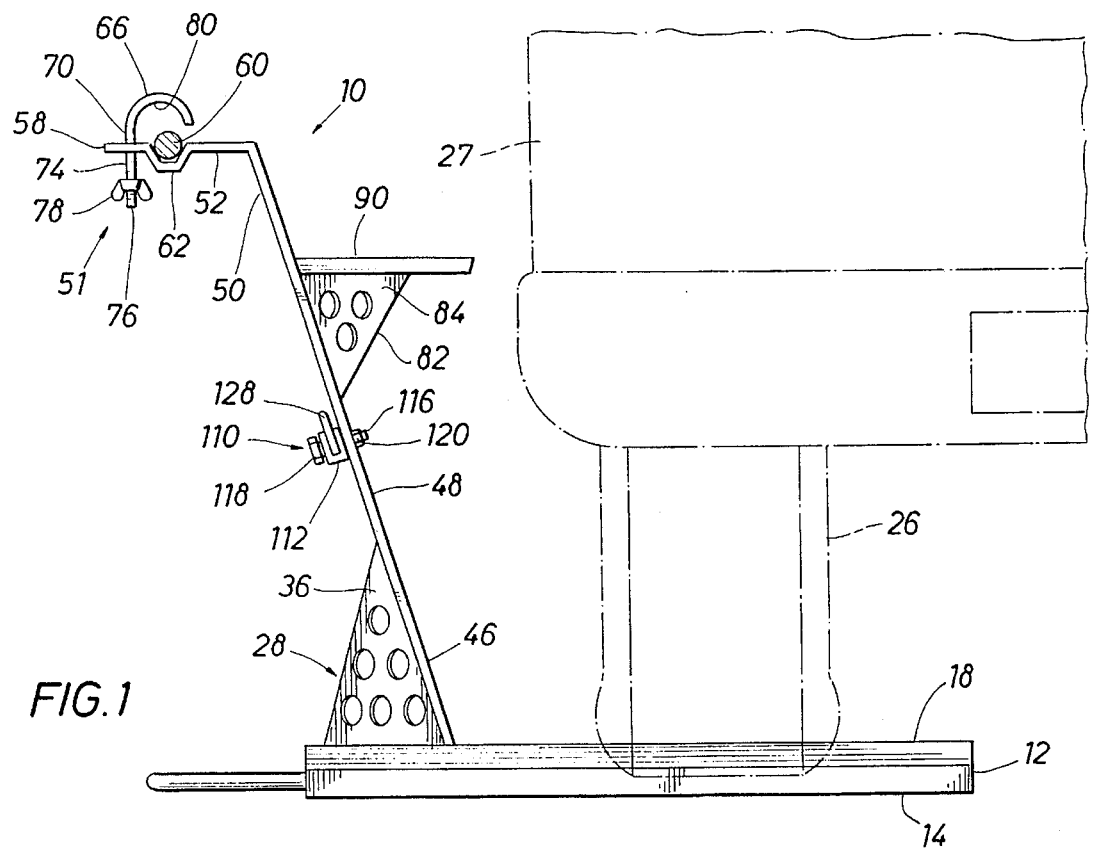
FIG. 1 is a side elevational view of a portable, vehicle stabilized bicycle stand mechanism constructed in accordance with the present invention and being shown with a vehicle wheel resting on the base portion thereof as shown in broken lines.

Referring now to the drawings and first to FIG. 1 a portable vehicle stabilized bicycle stand constructed in accordance with the present invention and representing the preferred embodiment, is illustrated generally at 10 and incorporates a support base 12 having a lower surface 14 adapted to rest on the ground, parking lot or any other suitable surface. The upper surface portion of the support base 12 defines a pair of spaced elongate projections or flanges 16 and 18 having inclined interior surfaces 20 and 22, respectively that intersect a planar intermediate surface 24 which is preferably disposed in parallel relation with the bottom planar surface 14. The parallel projections 16 and 18, the inclined surfaces 20 and 22 and the flat intermediate surface 24 define a centrally located recess which is capable of receiving the wheel of an automotive vehicle in the manner shown in broken lines at 26 of FIGS. 1 and 3. To access the central recess of the base structure the wheel 26 of the automotive vehicle must roll over either of the parallel side flanges or ribs 16 or 18. When the vehicle wheel is received within this central recess the weight of the vehicle wheel will secure the base structure 12 against movement and will stabilize the bicycle stand mechanism so that it can provide adequate support for a bicycle.

Centrally of the support base structure is provided a strut brace shown generally at 28 which is secured to the flat intermediate surface 24 of the base. The strut brace 28 is of angulated configuration and defines upstanding side walls 36 and 38 respectively. These walls are integrally connected and cooperatively defined a triangular inclined brace which is capable of bracing the lower end portion 46 of an upstanding, inclined support strut 48. The support strut is inclined so as to position its upper end 50 in spaced relation with the side surfaces 27 of the automotive vehicle that is used to stabilize the bicycle stand mechanism.

At its upper end 50 the upstanding bicycle stand strut 48 is provided with a support structure shown generally at 51 for supporting a bicycle so that the wheels of the bicycle, if desired, will be elevated above the surface on which the support base 12 rests. As shown particularly in FIGS. 1 and 4 the bicycle support structure 51 may be conveniently defined by a laterally projecting bicycle support element 52 which is formed as one continuous piece with the upper end 50 of the strut member and the inclined support strut 48. The bicycle support element 52, the upper end 50 of the strut member and the inclined support strut 48 may be composed of any one of a number of suitable materials such as metal or any one of a number of suitable polymer materials. Preferably the bicycle support elements are composed of a material having sufficient structural integrity for adequate support of a bicycle. As shown the bicycle support element is bent intermediate its length so as to provide a laterally projecting support 58 having sufficient structural integrity to provide adequate support for the frame of a bicycle mechanism 60. The support element 52 is formed intermediate its length to define an upwardly opening groove or recess 62 which is configured for receiving the horizontal top frame member 60 of a bicycle. This top frame member or bar 60 is typically manufactured of thin wall tubing having a circular cross-sectional configuration. The bicycle frame recess 62, as shown in FIG. 4, defines a recess having a flat bottom wall and having tapered side walls. If desired the recess may also be of any other suitable configuration such as triangular, circular, etc. without departing from the spirit and scope of this invention.

It is desirable, after placing the bicycle frame member in received relation within the support recess 62 to secure the bicycle frame so that it cannot be inadvertently separated therefrom. This feature is accomplished by providing a bicycle frame locking stay 66 having a portion 70 thereof which extends through a drilled bore 72 extending vertically through the support element end portion 58 near the outer extremity thereof. The bicycle stay is provided with a lower threaded extremity 74 which is received by the internally threaded section 76 of a stay actuator knob 78. The knob 78 is typically rotated clockwise to tighten the upper retainer portion 80 of the bicycle stay against the upper surface portion of the bicycle frame tube 60. When this is done the frame tube of the bicycle is locked within the receptacle defined by the recess 62.

In many cases it is desirable to provide the upstanding strut member 48 with a tool support tray device so that bicycle tools may be placed thereon during servicing and repair operations. As shown in FIGS. 1 and 4 the upstanding strut is provided with a tool tray support brace 82 which is secured to the strut 48 by means of welding or by any other suitable means of attachment. The tool tray brace structure 82 defines upstanding side walls 84 and 86 respectively. These side walls are integrally connected and corporatively define a triangular inclined brace to provide support for a tool tray 90. When so supported the upper surface of the tool tray will be oriented horizontally.

Figure 2:
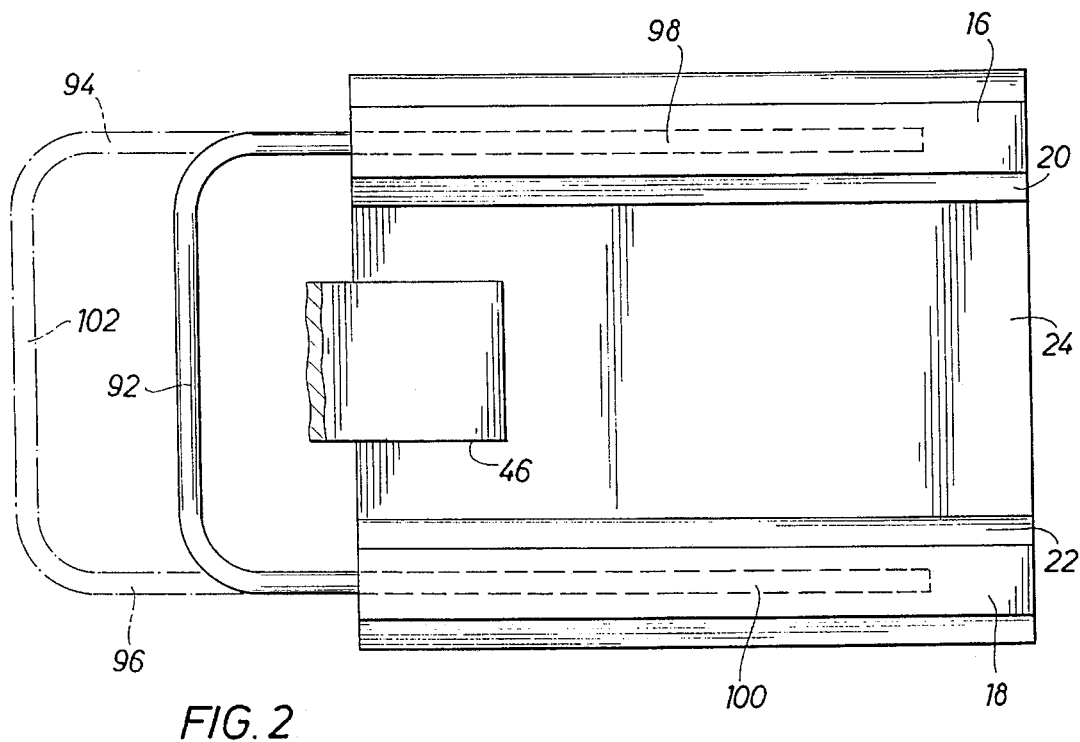
FIG. 2 is a plan view of the base portion of the bicycle stand structure of FIG. 1.

It may also be desirable to ensure that the bicycle stand, without a bicycle supported thereby, is capable of standing on its support base 12 even though the upstanding strut 48 is cantilevered to one side thereof. This feature is efficiently accomplished by providing a generally U-shaped outrigger support element shown generally at 92 having elongate leg members 94 and 96 that are received within respective internal bores 98 and 100 which are disposed in parallel relation within the base member 12. The arm members 94 and 96 are integrally interconnected by a transverse section 102. When it is desired that the bicycle stand be positioned in upstanding relation on its support base the outrigger member 92 is moved outwardly to the broken line position shown in FIG. 2. When extended in this manner the outrigger support will prevent the bicycle stand from tipping over in the direction of the support strut 48.

With the bicycle frame being supported within the recess 62 as shown in FIG. 1 the handle bar and front wheel assembly of the bicycle will be free for rotational movement. To prevent the handle bar and front wheel assembly from moving and thus preventing the front wheel from contacting the vehicle, it is desirable to provide means for securing either the front wheel or the handle bar so as to maintain the front wheel in alignment with the bicycle frame. According to the present invention, as shown in FIGS. 1, 4 and 5, a handle bar stabilizer strut, shown generally at 110, is provided intermediate the length of the upstanding support strut 48 and comprises a strut adjustment bracket 112 defining an elongate adjustment opening 114. The adjustment bracket 112 is maintained in assembly with the support strut 48 by means of a wing bolt 116 having a wing type bolt head 118 which is manually rotatable for tightening or loosening the bracket 112 relative to the support strut. The wing bolt extends through a bolt hole in the support strut 48 and is secured by a nut 120. If desired the nut 120 may be secured in fixed relation to the support strut so that it need not be restrained in any manner as the wing bolt is manually rotated. The elongate adjustment slot 114 allows the position of the bracket 112 to be laterally adjusted relative to the support strut 48 through a distance determined by the length of the slot. The support bracket is provided with an internally threaded aperture 122 within which is received the externally threaded extremity 124 of a handle bar stabilizer arm 126. The free extremity of the handle bar stabilizer arm defines a hook-like restraint bend 128 forming a preferably downwardly facing opening 130 within which is received the handle bar of the bicycle. With the handle bar being restrained by the hooked extremity 128 of the stabilizer arm 126, the position of the bracket 112 is adjusted relative to the support strut 48 sufficiently to position the handle bar and front wheel assembly of the bicycle as desired. Obviously with the bicycle supported in this manner and with the front wheel assembly rendered substantially immovable by the stabilizer system, the front wheel assembly may be efficiently serviced, cleaned or repaired. In view of the foregoing, it is evident that the present invention is one well adapted to attain all of the objects and features hereinabove set forth, together with other objects and features which are inherent in the apparatus disclosed herein.

As will be readily apparent to those skilled in the art, the present invention may be produced in other specific forms without departing from its spirit or essential characteristics. The present embodiment, is therefore, to be considered as illustrative and not restrictive, the scope of the invention being indicated by the claims rather than the foregoing description, and all changes which come within the meaning and range of the equivalence of the claims are therefore intended to be embraced therein.

What is claimed is:

1. A portable bicycle support stand adapted for stabilization and protection against theft by the wheel of an automotive vehicle, comprising:

(a) a base structure adapted to rest upon a surface and defining an intermediate vehicle wheel engagement portion adapted to be held to said surface by a wheel of an automotive vehicle for retention and stabilization thereof;

(b) a pair of rib elements being located on opposite sides of said intermediate portion and being of greater height than said intermediate portion, said rib elements cooperating with said intermediate portion to define a recess for receiving the wheel of the automotive vehicle, (c) a support strut extending upwardly from said base structure and being oriented relative to said wheel engagement portion so as to be positioned clear of the side of said automotive vehicle; and (d) bicycle support means being connected to said support strut and adapted for support and stabilization of a bicycle.

2. The portable bicycle support stand of claim 1, wherein said base structure further comprises:

(a) a generally rectangular base pad of generally rigid material; and (b) said intermediate portion and said rib elements being integral with said generally rectangular base pad and said intermediate portion having an upwardly facing intermediate surface defining said wheel engagement portion.

3. The portable bicycle support stand of claim 2, wherein: said rib elements of said base means being oriented in substantially parallel relation and define upper elongate substantially flat upwardly facing surfaces, said rib elements further defining inclined interior side surfaces disposed in intersecting relation with said upwardly facing surfaces and said intermediate surface.

4. The portable bicycle support stand of claim 1, further comprising:

(a) strut connection means being-provided on said base structure:

(b) said support strut being an elongate structural support having upper and lower ends, said lower end of said support strut being secured and positioned by said strut connection means, said upper end of said support strut being located laterally offset from said lower end.

5. The portable bicycle support stand of claim 4, wherein: said support strut is an elongate, substantially straight strut element and being oriented by said strut connection means in inclined relation with respect to the vertical and with said upper end thereof being located outwardly beyond one end of said support base.

6. The portable bicycle support stand of claim 4, wherein said bicycle support means comprises:

(a) a bicycle support element projecting laterally from said support strut and defining an upwardly facing receptacle adapted for receiving a portion of a bicycle frame in supported relation therein to thus provide support for said bicycle; and (b) means for securing said portion of said bicycle frame in releasably locked assembly within said upwardly facing receptacle of said bicycle support element.

7. The portable bicycle support stand of claim 6, wherein said means for securing a portion of a bicycle frame comprises:

(a) a locking stay element being in assembly with said bicycle support element; and (b) means for moving said locking stay element between a release position where said bicycle frame portion is free for upward movement from said upwardly facing receptacle and a locking position where said bicycle frame portion is secured by said locking stay element against upward movement from said upwardly facing receptacle.

8. The portable bicycle support stand of claim 1, further comprising:

a bicycle tool tray being fixed to said support strut and defining a substantially planar upper surface, with said portable bicycle support stand in the bicycle supporting position thereof, said planar upper surface of said bicycle tool tray being oriented substantially horizontally.

9. The portable bicycle support stand of claim 1, further comprising:

outrigger means being in movable assembly with said base structure and being movable from a retracted position where said outrigger means provides no stabilization of said base structure to a deployed position where said outrigger means is positioned to prevent tipping of said base structure in the direction of said bicycle support means.

10. The portable bicycle support stand of claim 1, further comprising:

a handle bar stabilizer being in adjustable assembly with said support strut and having a handle bar connector thereon adapted for restraining connection with the handle bar of a bicycle disposed in supported relation with said bicycle support stand.

11. A portable, bicycle support stand adapted for stabilization and protection against theft by the wheel of an automotive vehicle, comprising:

(a) a generally rectangular support base adapted to rest upon a parking surface and defining an upwardly facing vehicle wheel engagement surface adapted for engagement by a wheel of an automotive vehicle for temporarily securing said generally rectangular support base to said parking surface;

(b) an elongate support strut having a lower end portion disposed in immovable relation with said support base and having an upper end portion located above and in laterally offset relation with said lower end;

(c) bicycle support means being provided at the upper end portion of said support strut and projecting laterally in a direction away from said upper and lower ends of said support strut, said bicycle support means defining at least one upwardly facing bicycle frame receptacle adapted to receive a part of a bicycle frame for support of the bicycle in generally upstanding position; and (d) at least one bicycle frame locking stay being in assembly with said bicycle support means and being movable between a release position where said bicycle frame is free for upward separation movement from said bicycle frame receptacle and a locked position where said part of said bicycle frame is locked against upward movement from said bicycle frame receptacle.

12. The portable bicycle support stand of claim 11, wherein said support base comprises:

(a) a generally rectangular support base defining an intermediate portion defining said upwardly facing wheel engaging surface; and (b) a pair of rib elements being located on opposite sides of said intermediate portion and being of greater height than said intermediate portion, said rib elements cooperating with said upwardly facing wheel engaging surface of said intermediate portion to define a recess for receiving said wheel of said automotive vehicle and said rib elements retarding rolling of said vehicle wheel from said wheel engaging surface.

13. The portable bicycle support stand of claim 12, wherein:

said intermediate portion and said rib elements being integral with said generally rectangular support base and said rib elements of said base means being oriented in substantially parallel relation and defining inclined interior side surfaces.

14. The portable bicycle support stand of claim 11, further comprising:

(a) strut connection means being provided on said base means:

(b) said support strut being an elongate structural support having upper and lower ends, said lower end of said support strut being positioned by said strut connection means, said upper end of said support strut being located in laterally offset relation with respect to said lower end of said support strut.

15. The portable bicycle support stand of claim 14, wherein:

said support strut is an elongate, substantially straight strut element and being oriented by said strut connection means in inclined relation with respect to the vertical and with said upper end thereof being located outwardly beyond one end of said support base.

16. The portable bicycle support stand of claim 11, wherein said bicycle support means comprises:

(a) a bicycle support element being integral with said support strut and projecting laterally from said support strut, said bicycle support element defining an upwardly facing receptacle adapted for receiving a portion of a bicycle frame to thus provide support for said bicycle; and (b) said bicycle frame locking stay being in movable assembly with said bicycle support element and having a laterally extending restraining portion being movable downwardly against said portion of said bicycle frame for securing said bicycle frame in releasably supported assembly within said upwardly facing receptacle.

17. The portable bicycle support stand of claim 11, further comprising:

a bicycle tool tray being connected to said support strut and defining a substantially planar upper surface, with said portable bicycle support stand in operative position thereof said substantially planar upper surface being oriented substantially horizontally.

18. The portable bicycle support stand of claim 11, further comprising:

outrigger means being in movable assembly with said base means and being movable from a retracted position where said outrigger means provides no stabilization of said support base to a deployed position where said outrigger means is position to prevent tipping of said base means in the direction of said bicycle support means.

19. The portable bicycle support stand of claim 11 further comprising:

(a) a handle bar stabilizer being connected to said support strut and adapted for restraining engagement with the handle bar of said bicycle; and (b) adjustment means being provided on said handle bar stabilizer for adjustment of the position of said handle bar stabilizer relative to said support strut.

20. A portable bicycle support stand adapted for stabilization and protection against theft by a wheel of an automotive vehicle, comprising:

(a) a base structure adapted to rest on upon a surface and defining an upwardly facing recess of a configuration for receiving a wheel of an automotive vehicle therein, said base structure defining upwardly facing projections on opposed sides of said upwardly facing recess to restrain rolling of the wheel of the automotive vehicle from said upwardly facing recess;

(b) a support strut extending upwardly from said base structure and being oriented to clear the side of an automotive vehicle when a wheel of the vehicle is in engagement with said upwardly facing recess; and (c) a bicycle support being provided on said support strut and being adapted for support and stabilization of a bicycle.

* * * * *